US008600302B2

(12) United States Patent  (10) Patent No.: US 8,600,302 B2
Yun et al.  (45) Date of Patent: Dec. 3, 2013

(54) METHOD FOR RECOGNIZING A MODULE, APPARATUS FOR IMPLEMENTING THE SAME

(75) Inventors: Chan Phill Yun, Seoul (KR); Sun Ryang Kim, Seoul (KR); Woong Chang Kim, Seoul (KR); Young Hyeog Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 406 days.

(21) Appl. No.: 12/667,670

(22) PCT Filed: Aug. 1, 2008

(86) PCT No.: PCT/KR2008/004487
§ 371 (c)(1),
(2), (4) Date: Jan. 4, 2010

(87) PCT Pub. No.: WO2009/022801
PCT Pub. Date: Feb. 19, 2009

(65) Prior Publication Data
US 2011/0014868 A1    Jan. 20, 2011

(30) Foreign Application Priority Data

Aug. 10, 2007  (KR) .................. 10-2007-0080681
Aug. 10, 2007  (KR) .................. 10-2007-0080682

(51) Int. Cl.
*H04B 7/00*  (2006.01)
(52) U.S. Cl.
USPC ..................................................... 455/41.2
(58) Field of Classification Search
USPC ........................................................ 455/41.2
See application file for complete search history.

(56) References Cited

U.S. PATENT DOCUMENTS

| | | | | |
|---|---|---|---|---|
| 7,656,847 | B2* | 2/2010 | Mela et al. | 370/338 |
| 8,165,102 | B1* | 4/2012 | Vleugels et al. | 370/338 |
| 2002/0085516 | A1* | 7/2002 | Bridgelall | 370/329 |
| 2002/0138372 | A1* | 9/2002 | Ludtke | 705/27 |
| 2003/0177267 | A1* | 9/2003 | Orava et al. | 709/245 |
| 2004/0205246 | A1* | 10/2004 | Park | 709/245 |
| 2004/0243661 | A1* | 12/2004 | Ahn et al. | 709/200 |
| 2005/0079817 | A1* | 4/2005 | Kotola et al. | 455/41.2 |
| 2005/0153692 | A1* | 7/2005 | Hwang et al. | 455/434 |
| 2005/0286478 | A1* | 12/2005 | Mela et al. | 370/338 |
| 2006/0031924 | A1* | 2/2006 | Kwon et al. | 726/2 |
| 2007/0011301 | A1* | 1/2007 | Ong et al. | 709/224 |
| 2007/0036170 | A1* | 2/2007 | Gonikberg et al. | 370/431 |
| 2007/0082699 | A1* | 4/2007 | Karaoguz et al. | 455/553.1 |

(Continued)

FOREIGN PATENT DOCUMENTS

| | | |
|---|---|---|
| EP | 1 895 799 A1 | 3/2008 |
| KR | 10-2006-0096188 A | 9/2006 |
| KR | 10-2007-0010413 A | 1/2007 |
| WO | WO-2004/077752 A1 | 9/2004 |

*Primary Examiner* — Nay A Maung
*Assistant Examiner* — Erica Fleming-Hall
(74) *Attorney, Agent, or Firm* — Birch, Stewart, Kolasch & Birch, LLP

(57) ABSTRACT

An apparatus for recognizing a module and method thereof are disclosed. The present invention includes querying whether a first short-range communication module of a correspondent device exists by a first short-range communication scheme, if the first short-range communication module exists, receiving one of vendor information and minor device information from the correspondent device, and checking whether a second short-range communication module of the correspondent device exists based on one of the vendor information and the minor device information.

10 Claims, 12 Drawing Sheets

(56) References Cited

U.S. PATENT DOCUMENTS

| | | | |
|---|---|---|---|
| 2007/0198286 A1* | 8/2007 | Tomita | 705/1 |
| 2008/0171561 A1* | 7/2008 | Irony et al. | 455/466 |
| 2008/0175379 A1* | 7/2008 | Hansen et al. | 380/44 |
| 2008/0259882 A1* | 10/2008 | Abdel-Kader et al. | 370/338 |
| 2009/0070579 A1* | 3/2009 | Murakami et al. | 713/155 |
| 2009/0073946 A1* | 3/2009 | Morita | 370/338 |
| 2011/0205924 A1* | 8/2011 | Gonikberg et al. | 370/252 |

* cited by examiner

FIG. 8

Minor device information mapping table

| Value | Bit sequence(6bits) | Meaning |
|---|---|---|
| 0 | 000000 | Undefined |
| 1 | 000001 | Cellular |
| 2 | 000010 | Cordless |
| 3 | 000011 | Smart phone |
| 4 | 000100 | Gateway |
| 5 | 000101 | AP |
| 6-31 | 000110-011111 | reserved |
| 32-63 | 100000-111111 | HeteroNetworkExist |

FIG. 9

Type (TechType) information mapping table of heterogeneous communication module

| Value | Bit sequence (1Byte) | Meaning |
|---|---|---|
| 1 | 00000001 | WLAN |
| 2 | 00000010 | Zigbee |
| 3 | 00000011 | UWB |
| 4 | 00000100 | NFC |
| 5 | 00000101 | RFID |
| 6-255 | 00000110-11111111 | reserved |

METHOD FOR RECOGNIZING A MODULE, APPARATUS FOR IMPLEMENTING THE SAME

TECHNICAL FIELD

The present invention relates to an apparatus for recognizing a module and method thereof, and more particularly, to an apparatus for recognizing a module and method thereof, which is suitable for recognizing whether a communication module exists in a correspondent device via short-range communication scheme.

BACKGROUND ART

Generally, as short-range communication schemes have advanced diversely, a single device is frequently provided with at least two diverse communication modules. For instance, a single notebook computer adopts Bluetooth, Zigbee module and/or the like as well as wireless LAN.

DISCLOSURE OF THE INVENTION

Technical Problem

When devices provided with diverse communication modules are communicating with each other, a wireless LAN module of a correspondent device is recognized by wireless LAN scheme and a heterogeneous communication module (e.g., Bluetooth module) of the correspondent device is recognized by another communication scheme (e.g., Bluetooth scheme). In this case, it is however unable to check whether the wireless LAN module of the correspondent device and a heterogeneous communication module are provided to a single device or different devices.

In case that a Bluetooth communication module of a correspondent device is recognized by a Bluetooth communication scheme and a heterogeneous communication module except Bluetooth is recognized, it is unable to check whether the two kinds of the communication modules are provided to a single device.

In communicating with a specific correspondent device, there is a problem that a communication scheme is not freely selectable.

Technical Solution

Accordingly, the present invention is directed to an apparatus for recognizing a module and method thereof that substantially obviate one or more of the problems due to limitations and disadvantages of the related art.

An object of the present invention is to provide an apparatus for recognizing a module and method thereof, by which whether a correspondent device is provided with a heterogeneous communication module as well as a communication module (e.g., wireless LAN communication module, Bluetooth communication module) recognized as existing therein can be checked.

Advantageous Effects

Accordingly, the present invention provides the following effects and/or advantages.

First of all, the present invention is able to check whether a correspondent device is equipped with a heterogeneous communication module as well as a communication module which is currently in a communicating mode, thereby changing a communication scheme with the correspondent device.

Secondly, since a fact that a correspondent device is provided with a heterogeneous communication module is represented by a display, a user is able to select a communication scheme with the correspondent device.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 8 is an example for a minor device information mapping table;

FIG. 9 is an example for a tech-type information mapping table of a heterogeneous communication module;

BEST MODE

Figure 1:
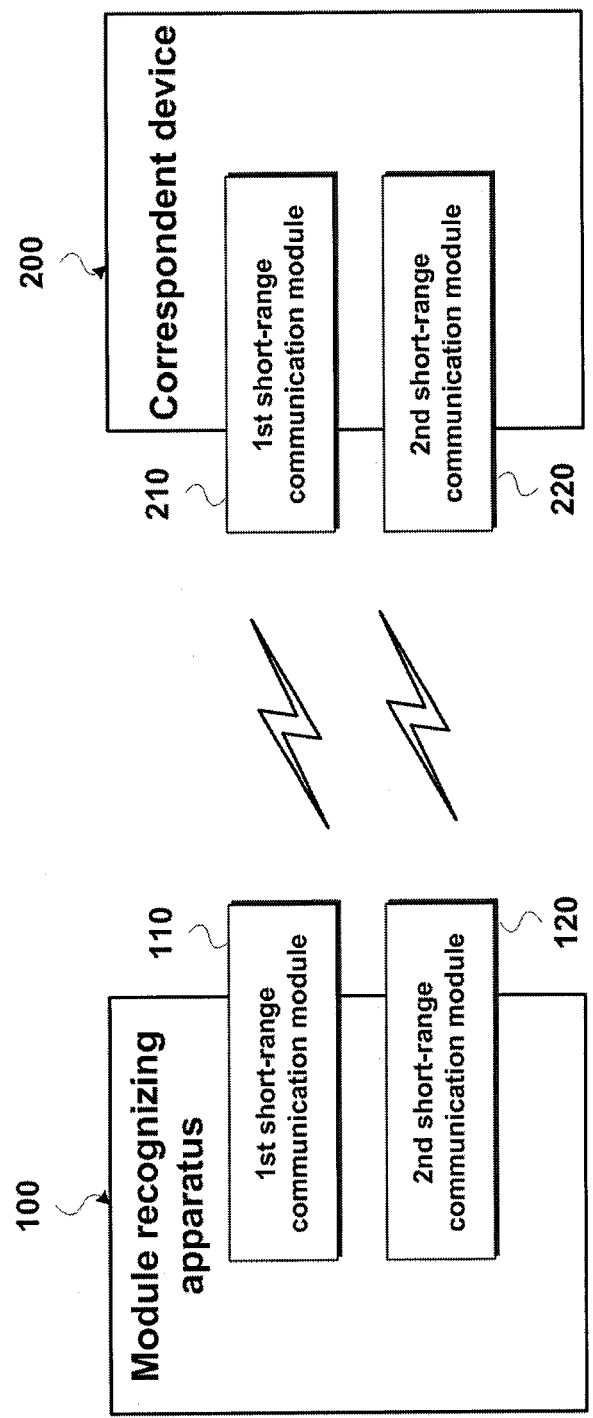
FIG. 1 is a schematic diagram for a relation between a module recognizing apparatus according to an embodiment of the present invention and a correspondent device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of recognizing a module according to the present invention includes querying whether a first short-range communication module of a correspondent device exists by a first short-range communication scheme, if the first short-range communication module exists, receiving one of vendor information and minor device information from the correspondent device, and checking whether a second short-range communication module of the correspondent device exists based on one of the vendor information and the minor device information.

According to the present invention, the first short-range communication scheme corresponds to one of a wireless LAN communication scheme or a Bluetooth communication scheme.

According to the present invention, the receiving step includes performing a query about the vendor information via a probe request and receiving the vendor information from the correspondent device via a probe response.

According to the present invention, the receiving step includes receiving the vendor information via a beacon frame.

According to the present invention, the vendor information includes an organized unique identifier and a content.

According to the present invention, the method further includes if the second short-range communication module exists, extracting first identification information from the vendor information.

According to the present invention, the vendor information includes an organized unique identifier and a content, the checking step is performed based on the organized unique identifier, and the extracting step is performed based on the content.

According to the present invention, the method further includes if the second short-range communication module exists, receiving second identification information by a communication scheme corresponding to the second short-range communication module and if the first identification information matches the second identification information, displaying a fact that both of the first short-range communication module and the second short-range communication module exist in the correspondent device.

According to the present invention, the first identification information and the second identification information include a network address of the second short-range communication module.

According to the present invention, the minor device information is included in device information and the device information further includes service information and main device information.

According to the present invention, the checking step includes if a most significant bit of a bit sequence corresponding to the minor device information is 1, checking an existence of the second short-range communication module and if the most significant bit of a bit sequence corresponding to the minor device information is not 1, checking a non-existence of the second short-range communication module.

According to the present invention, the method further includes if the second short-range communication module exists, obtaining first identification information by performing a service discovery protocol query.

According to the present invention, the first identification information obtaining step includes obtaining type information of the second short-range communication module and obtaining the first identification information according to the type information.

According to the present invention, a service class ID of the service discovery protocol includes a bit sequence which is not defined as a universal unique identifier.

According to the present invention, the method further includes if the second short-range communication module exists, receiving second identification information of the second short-range communication module by a communication scheme corresponding to the second short-range communication module and if the first identification information matches the second identification information, displaying a fact that both of the first short-range communication module and the second short-range communication module exist in the correspondent device.

To further achieve these and other advantages and in accordance with the purpose of the present invention, a computer-readable recording medium includes a program recorded therein to perform the above method.

To further achieve these and other advantages and in accordance with the purpose of the present invention, an apparatus for recognizing a module includes a first short-range communication module querying whether a first short-range communication module of a correspondent device exists by a first short-range communication scheme, the first short-range communication module, if the first short-range communication module exists, receiving one of vendor information and minor device information from the correspondent device and a control unit checking whether a second short-range communication module of the correspondent device exists based on one of the vendor information and the minor device information.

It is to be understood that both the foregoing general description and the following detailed description are exemplary and explanatory and are intended to provide further explanation of the invention as claimed.

Mode For Invention

Reference will now be made in detail to the preferred embodiments of the present invention, examples of which are illustrated in the accompanying drawings.

FIG. 1 is a schematic diagram for a relation between a module recognizing apparatus according to an embodiment of the present invention and a correspondent device. Referring to FIG. 1, an apparatus 100 for recognizing a module according to an embodiment of the present invention (hereinafter called a module recognizing apparatus 100) includes a first short-range communication module 110 and a second short-range communication module 120. And, a correspondent device 200 also includes a first short-range communication module 210 and a second short-range communication module 220. A communication scheme of the first short-range communication module 110 of the module recognizing apparatus 100 is equal to that of the first short-range communication module 210 of the correspondent device 200. Likewise, a communication scheme of the second short-range communication module 120 of the module recognizing apparatus 100 is equal to that of the second short-range communication module 220 of the correspondent device.

In this case, the first short-range communication modules 110 and 210 and the second short-range communication modules 120 and 220 are communication modules in the short-range communication scheme except wireless LAN modules and may adopt Bluetooth, Zigbee, UWB (ultra wideband), RF communication scheme and/or the like, by which the present is non-limited.

The module recognizing apparatus 100 recognizes a presence or non-presence of the first short-range communication module 210 of the correspondent device via the first short-range communication module 110 and also recognizes a presence or non-presence of the second short-range communication module 220 of the correspondent device via the second short-range communication module 120. Detailed configuration of the module recognizing apparatus 100 for checking whether the recognized first and second short-range communication modules 210 and 220 belong to a single correspondent device 200 and various steps of a module recognizing method shall be explained later in this disclosure. In particular, an embodiment for a case that the first short-range communication modules 110 and 210 include Wireless LAN modules is explained with reference to FIGS. 2 to 5. And, an embodiment for a case that the first short-range communication modules 110 and 210 include Bluetooth modules shall be explained with reference to FIGS. 6 to 11.

Figure 2:
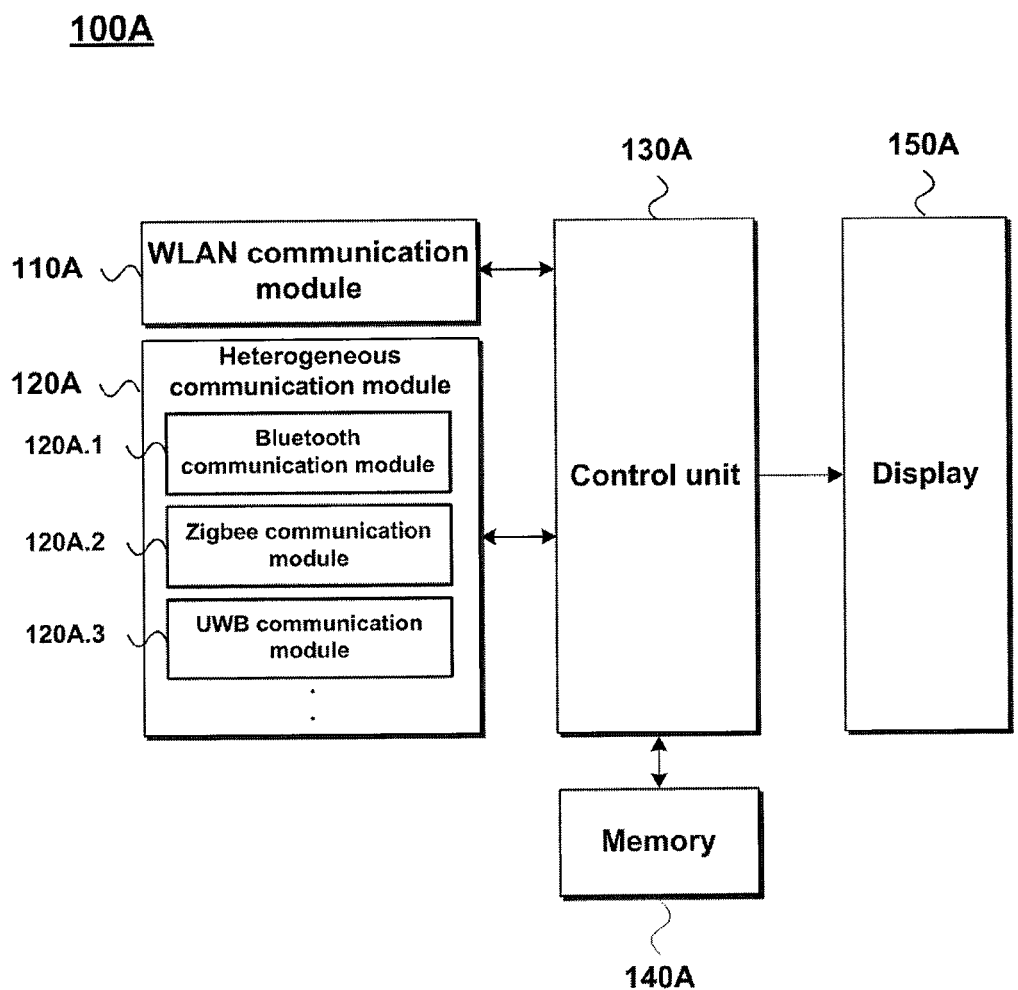
FIG. 2 is a configurational diagram of a module recognizing apparatus according to one embodiment of the present invention.

FIG. 2 is a configurational diagram of a module recognizing apparatus according to one embodiment of the present invention. A module recognizing apparatus 100A according to one embodiment of the present invention includes a wireless LAN module as a first short-range communication module. Referring to FIG. 2, the module recognizing apparatus 100A includes a wireless LAN module 110A, a second short-range communication module 120A, a control unit 130A, a memory 140A, and a display 150A. The heterogeneous communication module 120A includes at least one short-range communication module that is not a wireless LAN communication module. In particular, the heterogeneous communication module 120A is not the wireless LAN communication module but includes at least one of Bluetooth communication module 102A.1, a Zigbee communication module 120A.2 and an ultra wideband communication module 120A.3.

First of all, the wireless LAN module 110A is the module to perform communication with a wireless LAN module of a correspondent device through a wireless LAN scheme. In particular, the wireless LAN module 110A receives vendor information from the correspondent device through probe request and probe response in case of an active mode. And, the wireless LAN module 110A receives vendor information from the correspondent device through a beacon frame in case of a passive mode.

In this case, the vendor information may be included in a vendor specific element of a management frame in case of the 802.11 standard. And, FIG. 3 shows an example of a structure of a management frame.

Figure 3:
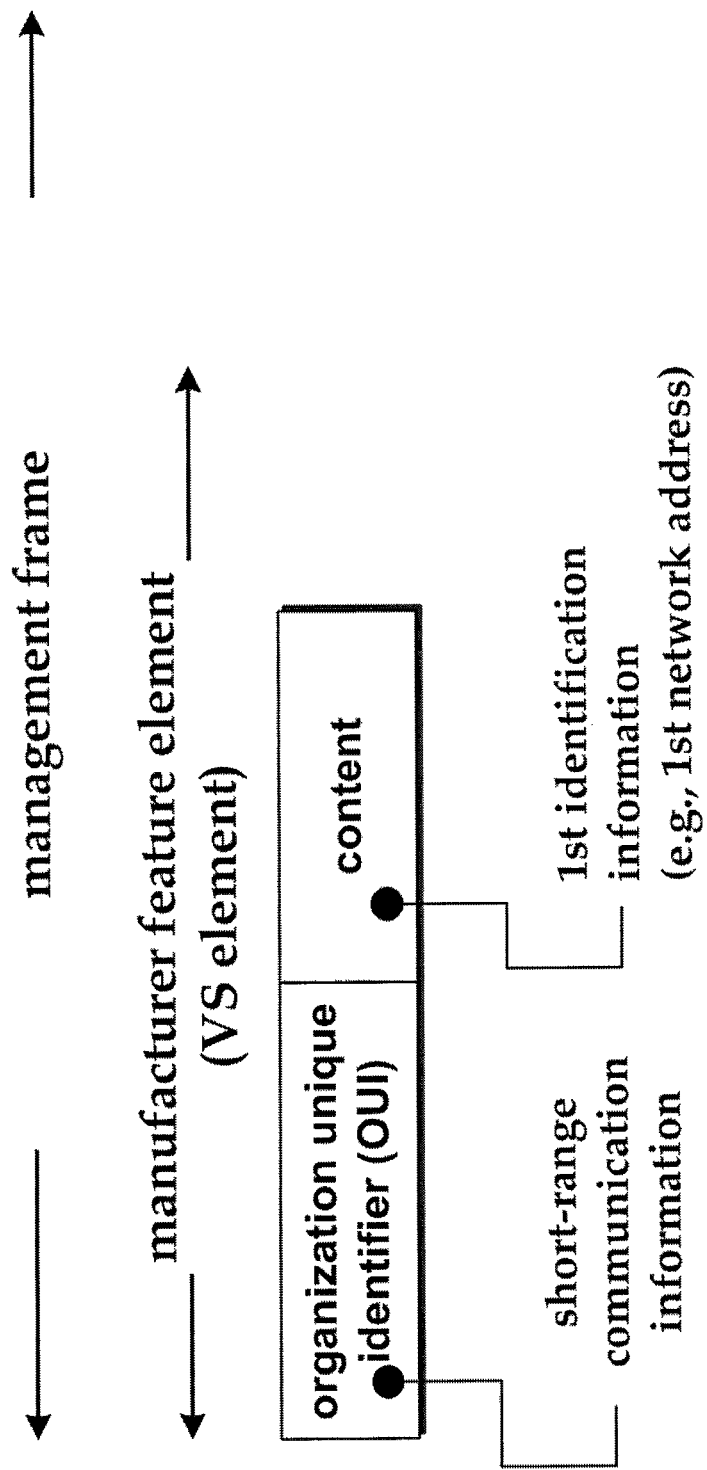
FIG. 3 is a diagram for an example of a structure of a management frame.

Referring to FIG. 3, a management frame includes a vendor specific element (VS element). The vendor specific element is the element enabling a vendor to define a content and includes an organized unique identifier (OUI) and a content. In the present invention, short-range communication information (WPAN INFO) is defined in the organized unique identifier (OUI) and a first identification information (e.g., a first network address of a heterogeneous communication module) is defined in the content. Hence, it is able to know a presence or non-presence of a heterogeneous communication module of a correspondent device and the first identification information (first network address). For reference, the first identification information (e.g., first network address) may be the identification information, which is received via the wireless LAN module 110A, of the correspondent device (heterogeneous communication module). And, second identification information (e.g., second network address), which will be mentioned later, indicates the identification information received not via the wireless LAN module 110A but via the heterogeneous communication module 120A.

A process for receiving vendor information incase of an active/passive mode is explained with reference to FIG. 2 as follows. In case of an active mode, a probe request is transmitted to a correspondent device by having short-range communication information (WPAN INFO) included in an organized unique identifier (OUI) of a vendor specific element (VS). If the correspondent device transmits a probe request by having short-range communication information (WPAN INFO) included in an organized unique identifier (OUI) of a vendor specific element (VS) and by having a first network address (BT (DEV2)) of a heterogeneous communication module (e.g., Bluetooth) included in a content, the module recognizing apparatus 100A receives the probe response. The above-mentioned description for the contents of the active mode case can be briefly summarized using symbols as follow.

[Probe Request and Probe Response in Active Mode]
Probe Request (VS: OUI=WPAN INFO, Content: Null)
Probe Response (VS: OUI=WPAN INFO, Content: BT(DEV2))

Meanwhile, in case of a passive mode, if a correspondent device broadcasts a beacon frame, in which short-range communication information (WPAN INFO) is included in an organized unique identifier (OUI) of a vendor specific element (VS) and in which a first network address (BT (DEV2)) of a heterogeneous communication module (e.g., Bluetooth) is included in a content, the module recognizing apparatus 100A receives the beacon frame and then checks the first network address (BT (DEV2)). The above-mentioned description for the contents of the passive mode case can be briefly summarized using symbols as follow.

[Beacon Broadcasting in Passive Mode]
BroadCast Beacon (VS: OUI=WPAN INFO, Content: BT(DEV2))
Listen Beacon of DEV2

Meanwhile, the wireless LAN module 110A can follow the WLAN (wireless LAN) standard, by which the present invention is non-limited.

The heterogeneous communication module 120A includes at least one communication module corresponding to one of various short-range communication schemes (e.g., Bluetooth, Zigbee, UWB (ultra wideband) communication, RF communication, etc.) for performing communication with the heterogeneous communication module of the correspondent device. And, the heterogeneous communication module receives second identification information (e.g., a second network address of a heterogeneous communication module) from the correspondent device by the corresponding communication scheme.

The control unit 130A checks whether the heterogeneous communication module of the correspondent device exists based on the vendor information received via the wireless LAN module 110A. If the heterogeneous communication module exists, the control unit 130A decides whether the first identification information received via the wireless LAN module 110A matches the second identification information received via the heterogeneous communication module 120A and then displays a corresponding result of the decision on the display 150A. In particular, if they match each other, the control unit 130A displays a fact that the heterogeneous communication module exists in the correspondent device as well as the wireless LAN module. If they fail to match each other, the corresponding procedure is terminated.

The memory 140A is a storage device for temporarily storing the first network address therein. And, the display 150A is a display device for displaying the fact that the heterogeneous communication module exists in the correspondent device as well as the wireless LAN module under the control of the control unit 130A.

Figure 4:
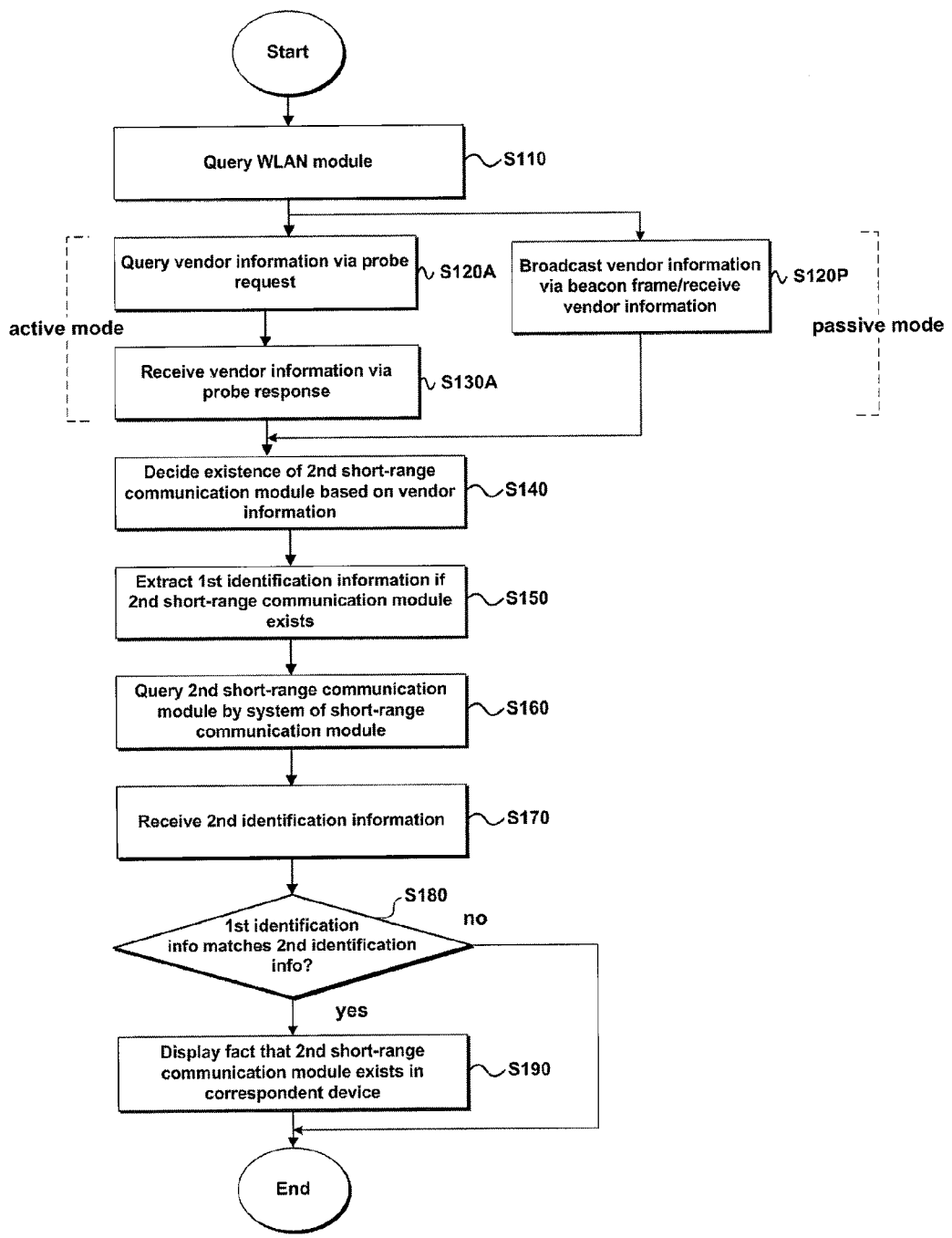
FIG. 4 is a flowchart for a module recognizing method according to one embodiment of the present invention.
Figure 5:
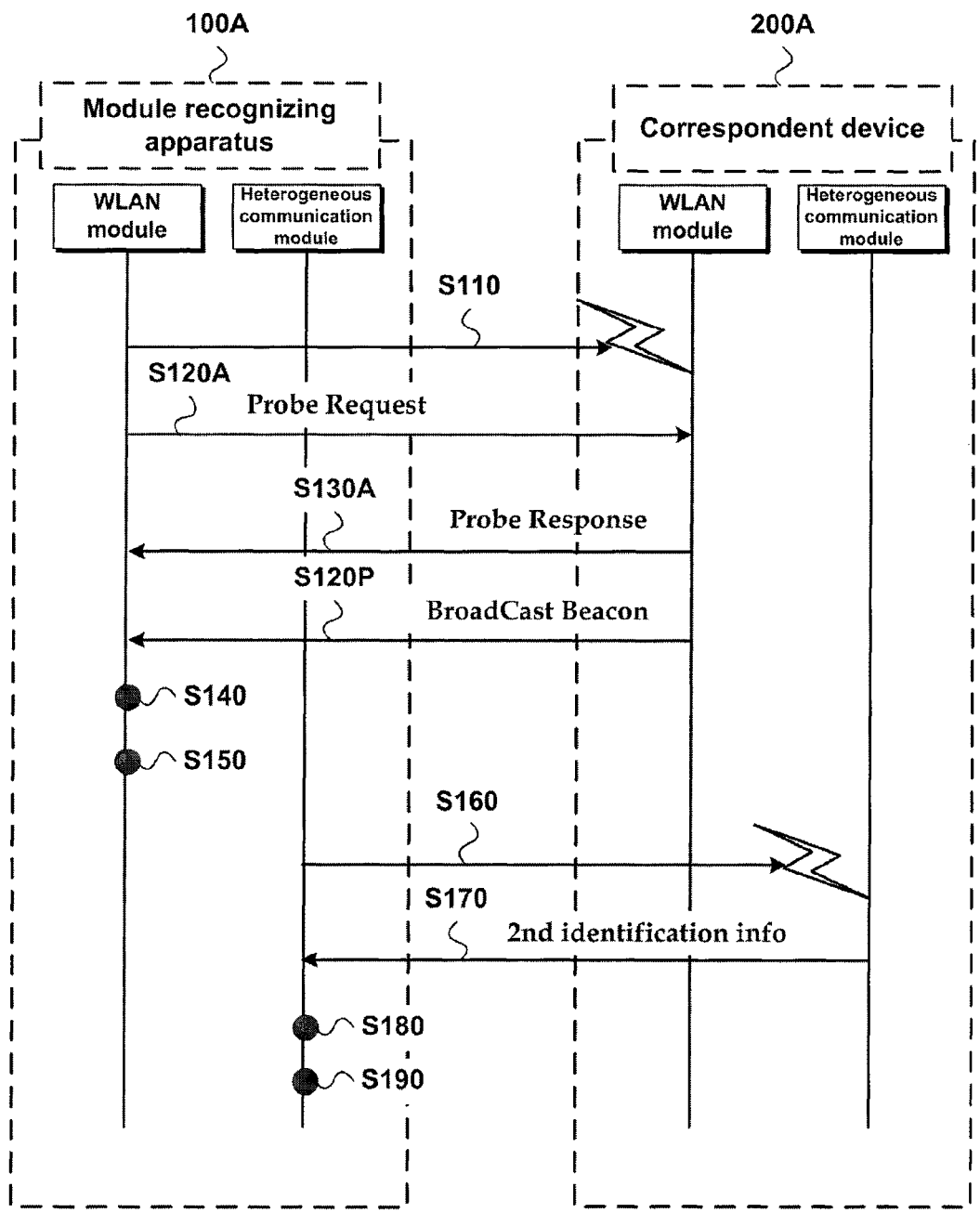
FIG. 5 is a diagram for the method shown in FIG. 4 to represent each communication module entity.

FIG. 4 is a flowchart for a module recognizing method according to one embodiment of the present invention, and FIG. 5 is a diagram for the method shown in FIG. 4 to represent each communication module entity. In the following description, the steps of a module recognizing method are respectively explained with reference to FIG. 4 and FIG. 5. Referring to FIG. 4, it can be observed that processes for both cases of active and passive modes are shown. Referring to FIG. 5, it can be observed that each step is carried by either the wireless LAN module 110A of the module recognizing apparatus 100A or the heterogeneous communication module 120A of the module recognizing apparatus 100A. Yet, although it is shown that the steps S140, S150, S180 and S190 are performed by the wireless LAN module and the like, it is apparent that those steps are performed by the control unit and the like.

First of all, the module recognizing apparatus queries whether a wireless LAN module exists in a correspondent device by wireless LAN scheme [S110]. As a result of the query of the step S110, if the wireless LAN module exists in the correspondent device, subsequent steps vary according to an active mode or a passive mode.

In case of the active mode, a vendor information query is made to the correspondent device via a probe request [S120A]. Subsequently, if the vendor information is received via a probe response made by the correspondent device, the module recognizing apparatus receives it [S130A].

In case of the passive mode, instead of performing the steps S120A and S130A, if the correspondent device broadcasts the vendor information via a beacon frame, the module recognizing apparatus receives the vendor information via the broadcasted beacon frame [S120P]. As the active and passive modes are explained with reference to FIG. 2 in the foregoing description, their details will be omitted in the following description.

Based on the vendor information (organized unique identifier (OUI)) received in the step S130A or S130P, it is checked whether a heterogeneous communication module exists in the correspondent device [S140]. If the heterogeneous communication module exists as a result of the step S140, first identification information (e.g., first network address of the heterogeneous communication module) from a content of the vendor information [S150]. Details for the step S150 are explained in the foregoing description with reference to FIG. 2 and are omitted in the following description.

Subsequently, the module recognizing apparatus queries whether a heterogeneous communication module except the wireless LAN module exists in the correspondent device by the communication scheme corresponding to the communication module queried through the steps S140 and S150 [S160]. For instance, if the step S140 confirms that a Bluetooth module exists in the correspondent device as well as the wireless LAN module, the step S160 is performed by the Bluetooth scheme.

As a result of the query in the step S160, if the heterogeneous communication module exists in the correspondent device, second identification information (e.g., second network address of the heterogeneous communication module) is received [S170].

It is then decided whether the first identification information (first network address) extracted in the step S150 matches the second identification information (second network address) received in the step S170 [S180].

If they match each other as a decision result of the step S180, it is confirmed that the heterogeneous communication module exists in the correspondent device provided with the wireless LAN module instead of a different correspondent device. Therefore, it is displayed on the display that the heterogeneous communication module exists in the correspondent device [S190]. Alternatively, instead of performing the step S190, a communication scheme can be automatically switched to one of the two communication schemes.

Figure 6:
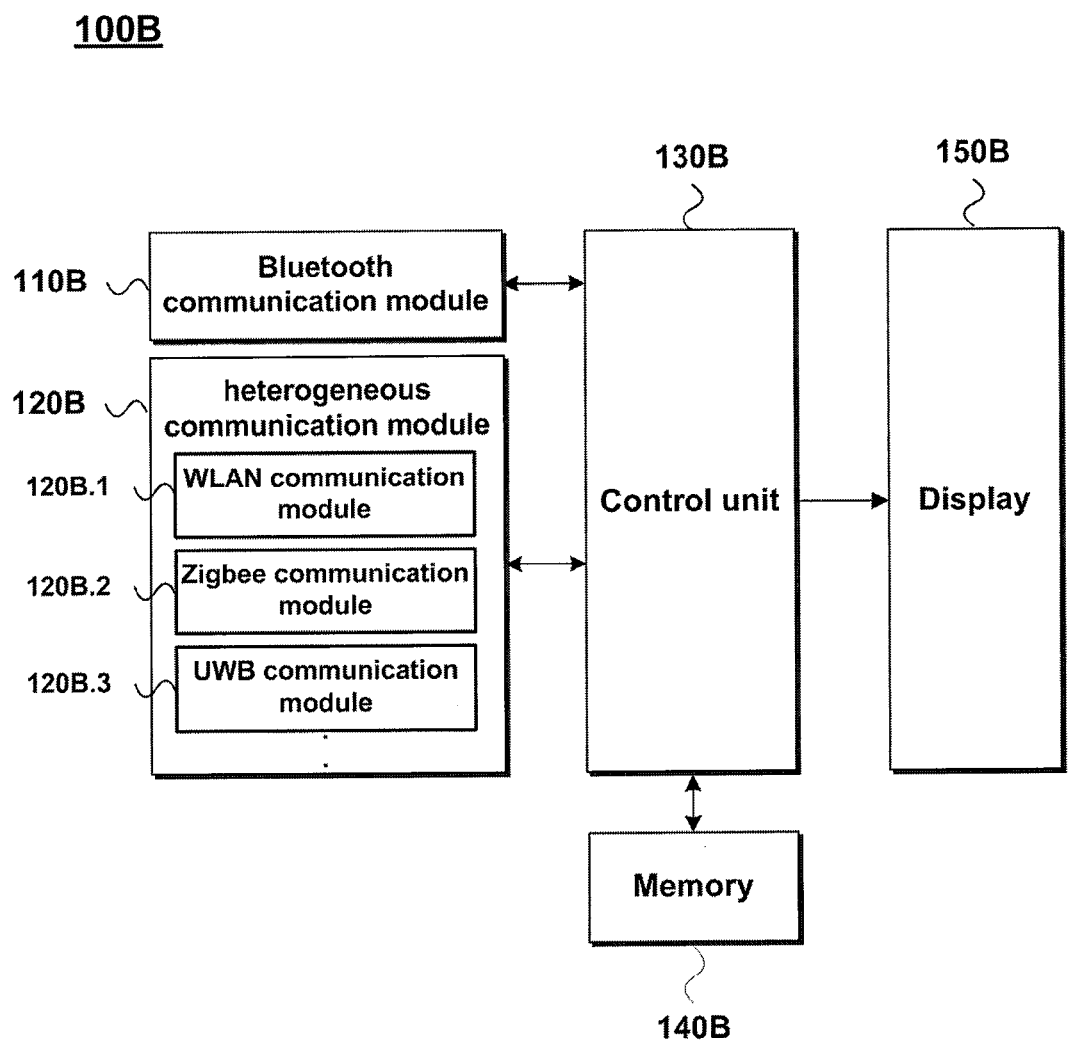
FIG. 6 is a configurational diagram of a module recognizing apparatus according to another embodiment of the present invention.

FIG. 6 is a configurational diagram of a module recognizing apparatus according to another embodiment of the present invention. A module recognizing apparatus 100B according to another embodiment of the present invention is provided with a Bluetooth communication module as a first short-range communication module.

Referring to FIG. 6, a Bluetooth communication module 110B is provided as a first short-range communication module and a heterogeneous communication module 120B including a communication module except the Bluetooth communication module is provided. In this case, the heterogeneous communication module 120B includes at least one of a wireless LAN communication module 120B.1, a Zigbee communication module 120B.2, an ultra wideband communication module 120B.3 and the like. Besides, a control unit 130B, a memory 140B and a display 150B are provided.

The Bluetooth module 110B is a module for performing communication with a Bluetooth module of a correspondent device by Bluetooth scheme. In particular, the Bluetooth module 110B queries whether the Bluetooth module of the correspondent device exists by the Bluetooth communication scheme. If the Bluetooth module exists, the Bluetooth module 110B receives minor device information from the correspondent device. Moreover, by performing an SDP (search discovery protocol) query under the control of the control unit 130B, the Bluetooth module receives first identification information (first network address) of a heterogeneous communication module of the correspondent device.

The heterogeneous communication module 120B includes at least one communication module corresponding to one of various communication schemes (e.g., wireless LAN, Zigbee, UWB (ultra wideband), RF communication, etc.) and performs communication with a heterogeneous communication module of the correspondent device. In particular, the heterogeneous communication module 120B receives second identification information (e.g., second network address) of the heterogeneous communication module from the correspondent device.

And, the control unit 130B checks whether the heterogeneous communication module exists in the correspondent device based on minor device information received via the Bluetooth module 110B.

Figure 7:
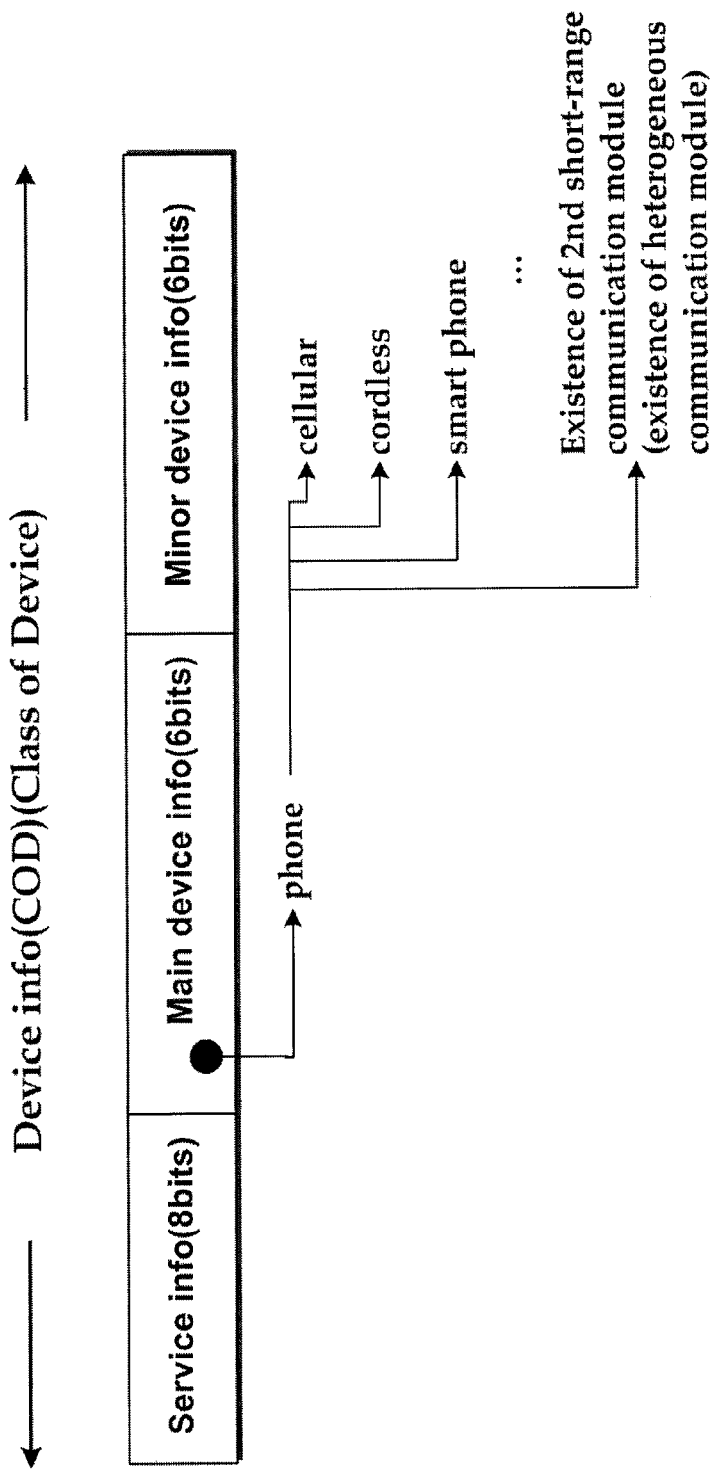
FIG. 7 is a diagram for an example of a structure of device information.

FIG. 7 is a diagram for an example of a structure of device information (COD: class of device). According to Bluetooth standard, as shown in FIG. 7, the device information (COD: class of device) includes: 1) service information (8 bits); 2) major device information (major device class) (6 bits); and 3) minor device information (6 bits). If a major device (major device class) is a phone, minor device information (6 bits) can be defined as meaning an existence of a heterogeneous communication module (HeteroNetworkExist) as well as a cellular phone, a cordless phone or a smart phone. And, one example of a mapping table of the minor device information is shown in FIG. 8.

Referring to FIG. 8, in case that a value of minor device information ranges from 1 to 5, it can be defined as meaning a cellular phone, a cordless phone, a smart phone or the like. And, a value (32~63), of which most significant bit begins with 1, can be defined as indicating an existence of a heterogeneous communication module (HeteroNetworkExist). Yet, other examples of the present invention are possible. In case of using a mapping table shown in FIG. 8, if a most significant bit of minor device information is 1 (value of minor device information is 32~63), the control unit 130B confirms that a heterogeneous communication module exists. If it the most significant bit is not 1 (value of minor device information is 0~31), the control unit 130B is able to confirm that a heterogeneous communication module does not exist. Yet, the mapping table shown in FIG. 8 is just one of examples. If a value of minor device information is 6 (bit sequence is 000110), the can be defined as meaning an existence of the heterogeneous communication module. Therefore, it is understood that the can exist various embodiments.

As a result of checking the existence or non-existence of the heterogeneous communication module based on the minor device information through the above-explained process, if the heterogeneous communication module exists in the correspondent device, the control unit 130B obtains type information of the heterogeneous communication module by performing an SDP (search discovery protocol) query through the Bluetooth module 110B and receives the first identification information (first network address of the heterogeneous communication module) of the heterogeneous communication module according to the type information. In this case, a service class ID of the service search protocol (SDP) preferably includes a bit sequence (e.g., 0x9934) that is not defined as a universal unique identifier (UUID) by the standard. A process for performing the service discovery protocol (SDP) query can be represented as follows.

[Service Discovery Protocol Query]
Service Protocol: NA
Attribute (HeteroNetworkExist=Yes),
TechType(1 Byte)=1
Tech Addr (128 byte)

Referring to the above expression, if it is decided that the heterogeneous communication module exists (HeteroNetworkExist=Yes), type information (TechType) of the heterogeneous communication module is obtained. One example of a type information mapping table of a communication module is shown in FIG. 9. For instance, if type information (TechType) is 1 (bit sequence is 00000001), referring to the table shown in FIG. 9, a type of the heterogeneous communication module is a wireless LAN module (WLAN). If type information is 3 (bit sequence is 00000011), a type of the heterogeneous communication module can be a ultra wideband module. Meanwhile, if the type information is the wireless LAN (WLAN), the first identification information (first network address of the heterogeneous communication module) (Tech Addr) can be a MAC address of the wireless LAN, by which the present invention is non-limited.

The control unit 130B decides whether the first identification information received via the Bluetooth module 110B matches the second identification information received via the heterogeneous communication module 120B according to the above process and then displays a corresponding result on the display 150B. In particular, if they match each other, the control unit 130B displays a fact that the heterogeneous communication module exists in the correspondent device as well as the Bluetooth module. If they fail to match each other, the control unit 130B terminates the procedure.

The memory 140B can include a storage device for storing the minor device information mapping table and the type information mapping table of the communication module therein. The mapping tables can include the tables shown in FIG. 8 and FIG. 9, to which the present invention is non-limited. Meanwhile, the first network address received via the Bluetooth module 110B can be temporarily stored in the memory 140B.

And, the display 150B is the display device for displaying the fact that the heterogeneous communication module exists in the correspondent device as well as the Bluetooth module under the control of the control unit 130B.

Figure 10:
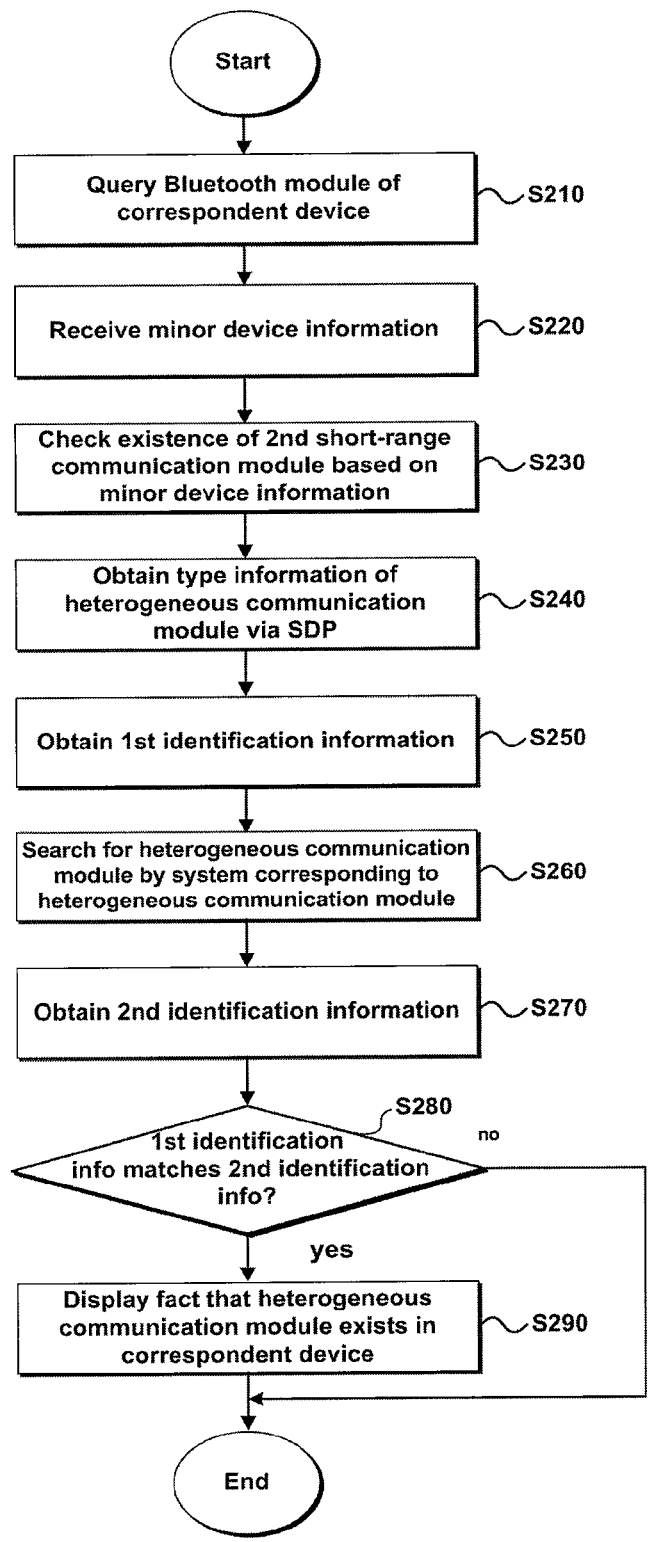
FIG. 10 is a flowchart for a module recognizing method according to another embodiment of the present invention.
Figure 11:
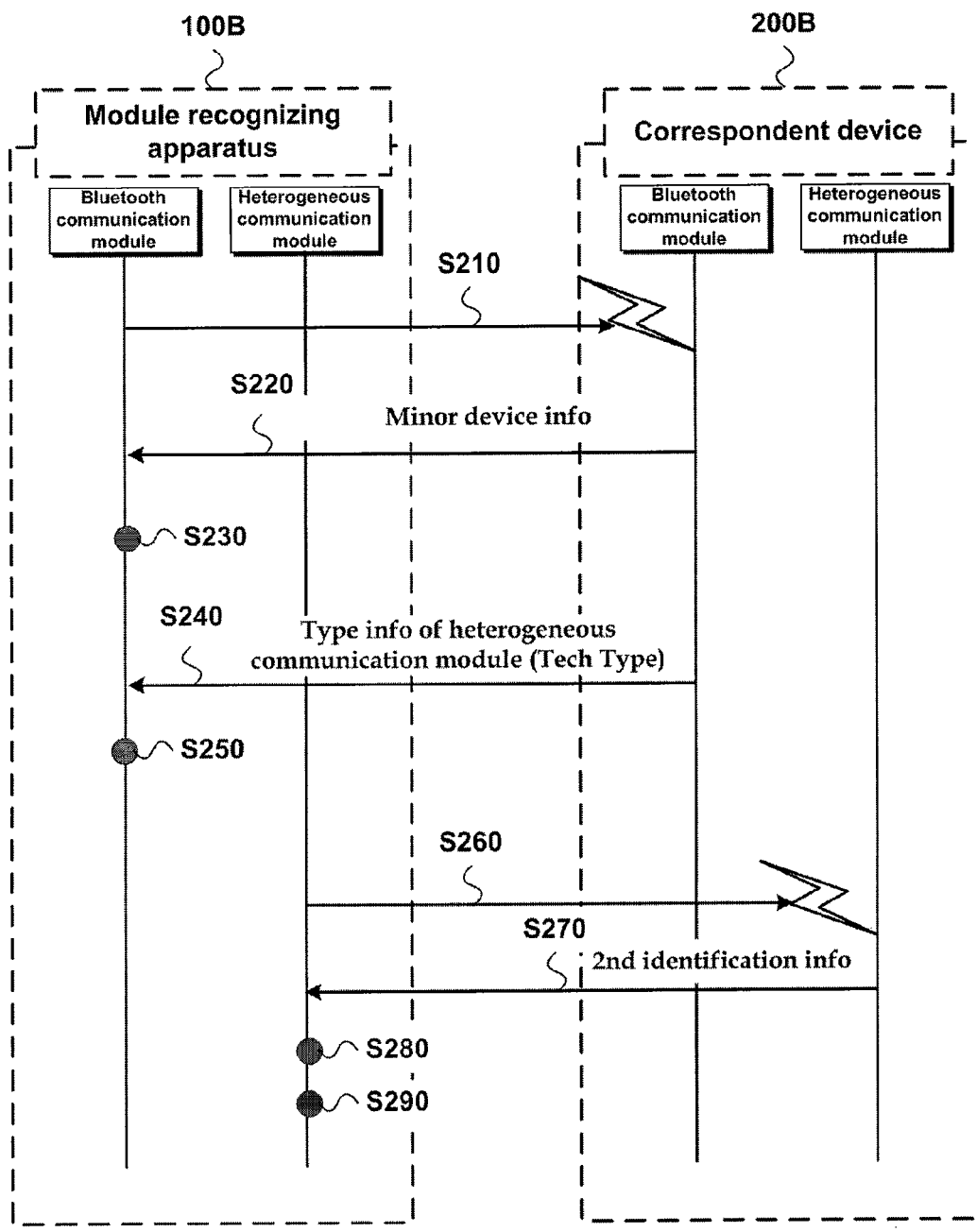
FIG. 11 is a diagram for the method shown in FIG. 10 to represent each communication module entity.

FIG. 10 is a flowchart for a module recognizing method according to another embodiment of the present invention, and FIG. 11 is a diagram for the method shown in FIG. 10 to represent each communication module entity. In the following description, the steps of a module recognizing method are respectively explained with reference to FIG. 10 and FIG. 11. Like the case of FIG. 5, referring to FIG. 11, it can be observed that each step is carried by either the wireless LAN module 110B of the module recognizing apparatus 100B or the heterogeneous communication module 120B of the module recognizing apparatus 100B. Yet, although it is shown that the steps S230, S250, S280 and S290 are performed by the Bluetooth module and the like, it is apparent that those steps are performed by the control unit and the like.

First of all, the module recognizing apparatus queries whether a Bluetooth module exists in a correspondent device according to the Bluetooth scheme [S210]. As a result of the query of the step S210, if the Bluetooth module exists in the correspondent device, the module recognizing apparatus receives minor device information from the correspondent device [S220]. Based on the minor device information, the module recognizing apparatus checks whether a heterogeneous communication module exists in the correspondent device [S230]. If the heterogeneous communication module exists in the correspondent device, the module recognizing apparatus obtains type information (e.g., wireless LAN module) of the heterogeneous communication module through a service discovery protocol (SDP) query [S240]. Subsequently, the module recognizing apparatus obtains first identification information (e.g., first network address of wireless LAN) [S250].

Subsequently, according to the communication scheme corresponding to the heterogeneous communication module queried about in the step S240, it is queried whether the heterogeneous communication module exists in the correspondent device [S260]. For instance, as a result of the query in the step S240, if the heterogeneous communication module is the wireless LAN (WLAN) module, it queried whether the wireless LAN module (WLAN) exists in the correspondent device by the wireless LAN scheme. As a result of the query in the step S260, if the heterogeneous communication module exists in the correspondent device, second identification information (e.g., second network address of the wireless LAN) is obtained from the correspondent device [S270].

It is then decided whether the first identification information (first network address) extracted in the step S250 matches the second identification information (second network address) received in the step S270 [S280].

If they match each other as a decision result of the step S280, it is confirmed that the heterogeneous communication module exists in the correspondent device provided with the Bluetooth module. Therefore, it is displayed on the display that the heterogeneous communication module exists in the correspondent device [S290]. Alternatively, instead of performing the step S290, a communication scheme can be automatically switched to one of the two communication schemes.

Figure 12:
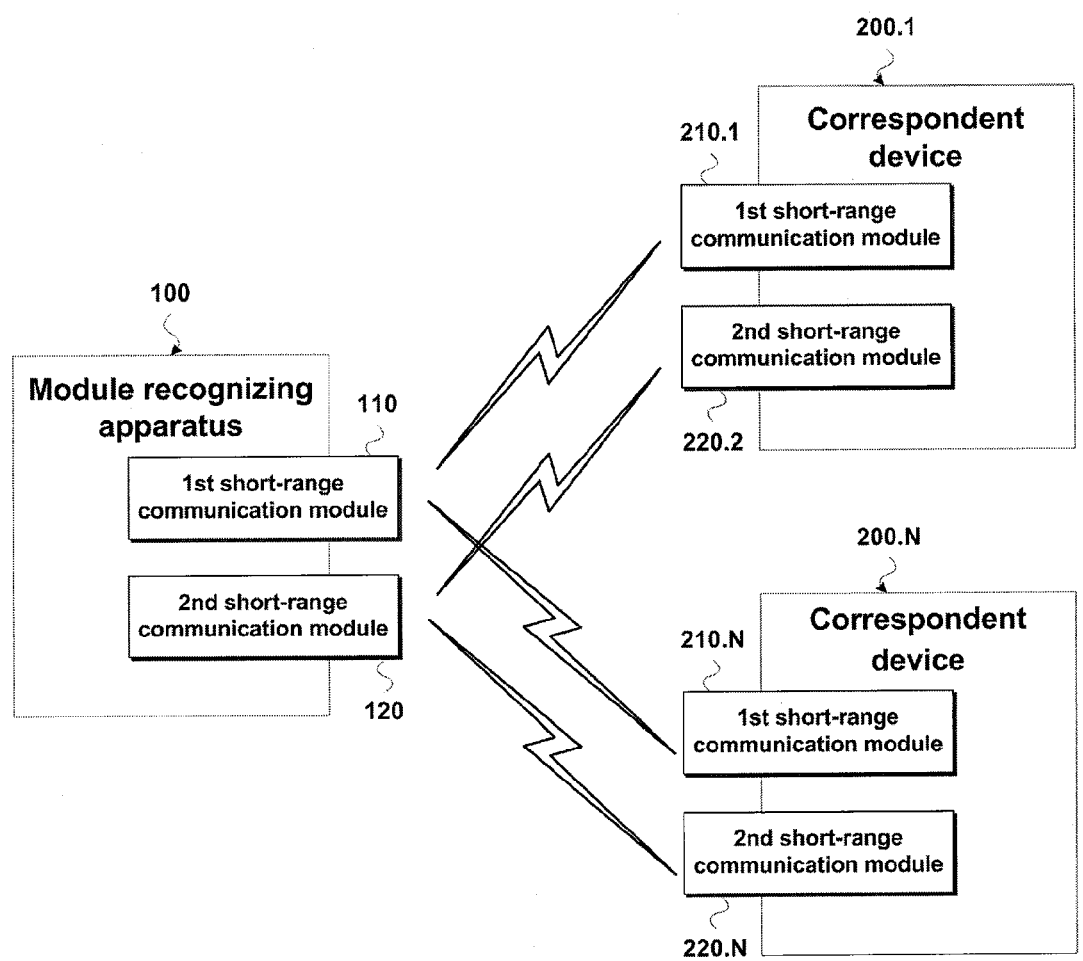
FIG. 12 is a schematic diagram for a relation between a module recognizing apparatus according to an embodiment of the present invention and a correspondent device in case that at least two correspondent devices exist.

FIG. 12 is a schematic diagram for a relation between a module recognizing apparatus according to an embodiment of the present invention and a correspondent device in case that at least two correspondent devices exist.

Referring to FIG. 12, a module recognizing apparatus 100 according to an embodiment of the present invention is able to perform communications with at least two or more correspondent devices 201.1, . . . , 200.N. As mentioned in the foregoing description, the module recognizing apparatus 100 receives first identification informations of heterogeneous communication modules 220.1, . . . , 220.2 of the correspondent devices via a first short-range communication module 110 (short-range communication module, Bluetooth communication module, etc.) and then receives second identification informations of second short-range communication modules 220.1, . . . , 220.2 of the correspondent devices via a second short-range communication module 120. If they are equal to each other, it can be confirmed that the heterogeneous communication modules 220.1, ..., 220.N exist in the corresponding correspondent devices 200.1, ..., 200.N, respectively.

INDUSTRIAL APPLICABILITY

Accordingly, the present invention is applicable to a terminal for performing short-range communication.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method of recognizing a module, comprising:
checking, by a device, whether a first short-range communication module exists in a correspondent device using a first short-range communication scheme, wherein the device comprises the first short-range communication module communicating by the first short-range communication scheme and a second short-range communication module communicating by a second short-range communication scheme that differs from the first short-range communication scheme;
when the first short-range communication module exists in the correspondent device and the first short-range communication module is a wireless LAN communication module, receiving vendor information from the first short-range communication module of the correspondent device by the first short-range communication scheme and checking whether the second short-range communication module exists in the correspondent device based on the vendor information that includes an organized unique identifier and a vendor information content, the organized unique identifier including short-range communication information, and the vendor information content including first identification information to identify the second short-range communication module in the correspondent device;
when the second short-range communication module exists in the correspondent device, receiving second identification information from the second short-range communication module of the correspondent device by the second short-range communication scheme; and
displaying an indication that both of the first short-range communication module and the second short-range communication module exist in the correspondent device when the first identification information matches the second identification information.

2. The method of claim 1, the vendor information receiving step comprising:
performing a query about the vendor information via a probe request; and
receiving the vendor information from the correspondent device via a probe response.

3. The method of claim 1, the vendor information receiving step comprising receiving the vendor information via a beacon frame.

4. The method of claim 1, wherein the first identification information and the second identification information comprise a network address of the second short-range communication module.

5. The method of claim 1, further comprising:
when the first short-range communication module exists in the correspondent device and the first short-range communication module is a Bluetooth communication module, receiving minor device information from the first short-range communication module of the correspondent device by the first short-range communication scheme;
checking whether the second short-range communication module exists in the correspondent device based on the minor device information,
wherein the minor device information includes information to identify the second short-range communication module in the correspondent device, and
wherein the minor device information is included in device information, and wherein the device information further comprises service information and main device information;
obtaining third identification information to identify the second short-range communication module by performing a service discovery protocol query when the second short-range communication module exists in the correspondent device;
receiving fourth identification information from the second short-range communication module of the correspondent device by the second short-range communication scheme when the second short-range communication module exists in the correspondent device; and
displaying an indication that both of the first short-range communication module and the second short-range communication module exist in the correspondent device when the third identification information matches the fourth identification information.

6. The method of claim 5, wherein the checking step comprises:
when a most significant bit of a bit sequence corresponding to the minor device information is 1, checking an existence of the second short-range communication module in the correspondent device; and
when the most significant bit of a bit sequence corresponding to the minor device information is not 1, checking a non-existence of the second short-range communication module in the correspondent device.

7. The method of claim 5, wherein the obtaining of the third identification information comprises:
obtaining type information of the second short-range communication module; and
obtaining the third identification information according to the type information.

8. The method of claim 5, wherein a service class ID of the service discovery protocol comprises a bit sequence which is not defined as a universal unique identifier.

9. An apparatus for recognizing a module, comprising:
a first short-range communication module configured to:
communicate by a first short-range communication scheme, and
check whether the first short-range communication module exists in a correspondent device using the first short-range communication scheme,
wherein, when the first short-range communication module exists in the correspondent device and the first short-range communication module is a wireless LAN communication module, the first short-range communication module receives vendor information from the first short-range communication module of the correspondent device by the first short-range communication scheme, and wherein the vendor information comprises an organized unique identifier including short-range communication information and a vendor information content including first identification information to identify the second short-range communication module in the correspondent device;

a second short-range communication module configured to:

communicate by a second short-range communication scheme that differs from the first short-range communication scheme, and receive second identification information from the second short-range communication module of the correspondent device by the second short-range communication scheme when the second short-range communication module exists in the correspondent device; and a control unit configured to:

check whether the second short-range communication module exists in the correspondent device based on the vendor information, and display an indication that both of the first short-range communication module and the second short-range communication module exist in the correspondent device when the first identification information matches the second identification information.

10. The apparatus of claim 9, wherein the first short-range communication module exists in the correspondent device and the first short-range communication module is a Bluetooth communication module, wherein the first short-range communication module is configured to receive minor device information from the first short-range communication module of the correspondent device by the first short-range communication scheme, wherein the minor device information includes information to identify the second short-range communication module in the correspondent device and obtain third identification information to identify the second short-range communication module by performing a service discovery protocol query when the second short-range communication module exists in the correspondent device, wherein the second short-range communication module is configured to receive fourth identification information from the second short-range communication module of the correspondent device by the second short-range communication scheme, and wherein the control unit is configured to display the indication that both of the first short-range communication module and the second short-range communication module exist in the correspondent device when the third identification information matches the fourth identification information.

* * * * *